US009359489B2

(12) United States Patent
Blaschke et al.

(10) Patent No.: US 9,359,489 B2
(45) Date of Patent: Jun. 7, 2016

(54) POLYMER COMPOSITION HAVING A FILLER CONTENT AND COEXTRUDED SHEET OBTAINABLE THEREFROM

(75) Inventors: Ulrich Blaschke, Krefeld (DE); Heinrich Hähnsen, Duisburg (DE); Peter Schwarz, Krefeld (DE); Klaus Kraner, Solingen (DE); Hans-jürgen Thiem, Dormagen (DE); Michael Wagner, Moers (DE)

(73) Assignee: Covestro Deutschland AG, Leverkusen (DE)

( * ) Notice: Subject to any disclaimer, the term of this patent is extended or adjusted under 35 U.S.C. 154(b) by 285 days.

(21) Appl. No.: 14/237,063

(22) PCT Filed: Aug. 7, 2012

(86) PCT No.: PCT/EP2012/065459
§ 371 (c)(1),
(2), (4) Date: Feb. 4, 2014

(87) PCT Pub. No.: WO2013/020982
PCT Pub. Date: Feb. 14, 2013

(65) Prior Publication Data
US 2014/0220273 A1 Aug. 7, 2014

(30) Foreign Application Priority Data

Aug. 8, 2011 (EP) .................................... 11176857

(51) Int. Cl.
*C08K 7/28* (2006.01)
*B32B 27/20* (2006.01)
*C08K 9/06* (2006.01)
*C08L 69/00* (2006.01)
*B32B 27/36* (2006.01)
*B29C 47/06* (2006.01)
*B32B 27/08* (2006.01)
*C08K 3/32* (2006.01)
*C08K 5/134* (2006.01)

(52) U.S. Cl.
CPC . *C08K 7/28* (2013.01); *B29C 47/06* (2013.01); *B32B 27/08* (2013.01); *B32B 27/20* (2013.01); *B32B 27/365* (2013.01); *C08K 3/32* (2013.01); *C08K 5/1345* (2013.01); *C08K 9/06* (2013.01); *C08L 69/00* (2013.01); *B32B 2250/244* (2013.01); *B32B 2264/101* (2013.01); *B32B 2305/30* (2013.01); *Y10T 428/1321* (2015.01); *Y10T 428/24967* (2015.01); *Y10T 428/249972* (2015.04)

(58) Field of Classification Search
CPC .................. B32B 2250/244; B32B 2264/101; B32B 2305/30; B32B 27/20; B32B 27/365; B32B 27/08; C08K 7/28; C08K 9/06; C08K 3/32; C08K 5/1345; C08L 69/00; B29C 47/06; Y10T 428/1321; Y10T 428/24967; Y10T 428/249972
See application file for complete search history.

(56) References Cited

U.S. PATENT DOCUMENTS

| 2,991,273 A | 7/1961 | Hechelhammer et al. |
| 2,999,825 A | 9/1961 | Floyd et al. |
| 2,999,846 A | 9/1961 | Schnell et al. |
| 3,028,635 A | 4/1962 | Herubel |
| 3,148,172 A | 9/1964 | Fox |
| 3,271,367 A | 9/1966 | Schnell et al. |
| 3,879,348 A | 4/1975 | Serini et al. |
| 4,849,265 A | 7/1989 | Ueda et al. |
| 4,982,014 A | 1/1991 | Freitag et al. |
| 5,288,778 A | 2/1994 | Schmitter et al. |
| 5,334,427 A | 8/1994 | Cognet et al. |
| 5,821,380 A | 10/1998 | Holderbaum et al. |
| 5,883,165 A | 3/1999 | Krohnke et al. |
| 6,204,971 B1 | 3/2001 | Morris et al. |
| 2008/0132617 A1 | 6/2008 | Eckel et al. |

FOREIGN PATENT DOCUMENTS

| DE | 1570703 A1 | 2/1970 |
| DE | 2036052 A1 | 1/1972 |
| DE | 2 063 050 A1 | 7/1972 |
| DE | 2211956 A1 | 10/1973 |
| DE | 2721886 A1 | 11/1978 |
| DE | 3832396 A1 | 2/1990 |
| DE | 102006055478 A1 | 5/2008 |
| EP | 0 500 496 A1 | 8/1992 |
| EP | 0839623 A1 | 5/1998 |
| FR | 1561518 A | 3/1969 |
| GB | 1122003 A | 7/1968 |
| GB | 1229482 A | 4/1971 |
| GB | 1367790 A | 9/1974 |
| GB | 1585327 A | 2/1981 |
| GB | 1585338 A | 2/1981 |
| JP | 6345953 | 12/1994 |
| JP | 72-58528 | 10/1995 |
| WO | WO-9607525 A1 | 3/1996 |
| WO | WO-96/15102 A2 | 5/1996 |
| WO | WO-02062877 A1 | 8/2002 |
| WO | WO-2007025663 A1 | 3/2007 |

OTHER PUBLICATIONS

International Search Report for PCT/EP2012/065459 mailed Oct. 9, 2012.

*Primary Examiner* — Michael C Miggins
(74) *Attorney, Agent, or Firm* — Drinker Biddle & Reath LLP

(57) ABSTRACT

The present invention relates to a polymer composition containing polycarbonate with a weight-average molecular weight Mw of from 24,000 to 33,000 and 5.0 wt. % to 20.0 wt. % (based on the total amount of the composition) of glass hollow spheres with an alkalinity of less than 1.0 meq/g. The present invention furthermore provides coextruded sheets in which the coextruded layer contains this polymer composition, and shaped articles produced therefrom, in particular containers and pieces of luggage, very particularly suitcases. Sheets which are obtainable with the polymer composition according to the invention have a high mechanical stability, a high scratch resistance, pleasant haptic properties and an excellent homogeneous external visual impression. The present invention furthermore relates to a process for the preparation of these polymer compositions and a process for production of the sheets according to the invention.

13 Claims, No Drawings

POLYMER COMPOSITION HAVING A FILLER CONTENT AND COEXTRUDED SHEET OBTAINABLE THEREFROM

CROSS-REFERENCE TO RELATED APPLICATIONS

This application is a national stage application (under 35 U.S.C. §371) of PCT/EP2012/065459, filed Aug. 7, 2012, which claims benefit of European application 11176857.8, filed Aug. 8, 2011.

The present invention relates to a polymer composition and coextruded sheets in which the coextruded layer contains this polymer composition, and shaped articles produced therefrom, in particular containers and pieces of luggage, very particularly suitcases. The shaped articles can be produced, for example, by thermoforming. Sheets which are obtainable with the polymer composition according to the invention have a high mechanical stability, a high scratch resistance, pleasant haptic properties and an excellent homogeneous external visual impression. The present invention furthermore relates to a process for the preparation of these polymer compositions and a process for production of the sheets according to the invention.

Some set-ups for providing materials of high mechanical stability have already been combined and corresponding surface properties described in the prior art. In these, inter alia, plastics compositions treated with reinforcing substances have been resorted to.

US 20080132617 A1 thus describes a polycarbonate blend containing glass hollow spheres which has improved flow properties, a high rigidity, low shrinkage properties and a high scratch resistance.

WO2007025663 A1 describes a polymer composition containing a specific polyolefin together with polycarbonate or other thermoplastics, and a filler of glass. A soft-touch material of high scratch resistance is obtained by means of this special mixture.

JP 72-58528 A discloses polycarbonate with surface-treated glass hollow spheres as a filler. The polycarbonates have good mechanical properties.

U.S. Pat. No. 5,334,427 A discloses an at least three layered sheet of a thermoplastic. In this context, a glass fibre mat is bonded via a chemical binder layer to a base layer containing at least two different fillers. The sheet can be embossed and is particularly stable from a mechanical point of view.

GB 1585327 and GB 1585338 already describe the production of sheets with glass spheres.

U.S. Pat. No. 4,849,265 A describes flexible films of PC, in which glass spheres silanized on the surface are embedded in a layer of a special material, the material not being a polycarbonate.

WO 1996007525 A1 describes insert moulding of a thin polycarbonate moulding containing glass spheres to produce a scratch-resistant surface.

U.S. Pat. No. 6,204,971 B1 describes a projection screen in which glass hollow spheres are pressed into an opaque layer, the layer in turn being applied to a transparent polycarbonate sheet in order to achieve the highest possible diffusion of light in this manner.

WO 2002062877A1 describes the improvement in the scratch resistance and further properties, such as mechanical properties and flameproofing properties, of PET and other plastics, such as polycarbonate, by glass materials in particle or fibre form. The production of extruded sheets in which glass-containing material is applied to the sheets as a coextruded layer on one or both sides is moreover described.

With all the efforts to date, however, there is still a need for coextruded sheets having a high mechanical stability, a high scratch resistance and pleasant haptic properties, which are further improved significantly in particular with regard to their visual properties with respect to a homogeneous appearance.

The object of the present invention was thus to provide a polymer composition and coextruded sheets which contain the polymer composition in one layer, preferably a layer applied by coextrusion, and which have a high mechanical stability, a high scratch resistance, pleasant haptic properties and an excellent homogeneous external visual impression.

It has been possible, surprisingly, to achieve the object described with the aid of a polymer composition which contains polycarbonate and particular glass hollow spheres. Coextruded sheets according to the invention comprising a base layer and a coextruded layer which is applied to at least one side of the base layer, preferably to one side of the base layer, and contains the polymer composition according to the invention, have the required properties. The melt volume rates (MVR) of the polycarbonates of the base layer and of the coextruded layer are preferably different.

The present invention therefore provides:
a polymer composition P) containing a polycarbonate with a weight-average molecular weight Mw of from 24,000 to 33,000 g/mol and a preferred melt volume rate of from 8 to 16 $cm^3$/min and 5.0 wt. % to 20.0 wt. % (based on the total amount of the composition) of glass hollow spheres with an alkalinity of less than 1.0 meq/g and conventional additives, the polymer composition containing no further thermoplastic polymers.

The present invention furthermore provides a sheet comprising two layers A) and B), wherein layer A) comprises a polymer composition—as is described above and in the claim—and layer B) comprises polycarbonate with a melt volume rate (MVR) of from 3 to 9 $cm^3$/10 min, preferably 4 to 9 $cm^3$/10 min, wherein the polycarbonate in layer A) has a melt volume rate (MVR) of from 8 to 16 $cm^3$/10 min. Preferably, the melt volume rate of the polycarbonates of the base layer and of the extruded layer are different.

The invention furthermore provides a process for the preparation of the polymer composition P) according to claim 1, wherein the polycarbonate is mixed with the glass hollow spheres on a twin-screw extruder, characterized in that the glass hollow beads are introduced directly into the melt, which has a melt temperature of from 320° C. to 360° C., via a lateral intake and the extruder speed is 300 rpm to 500 rpm and the polycarbonate has a melt volume rate (MVR) of from 8 to 16 $cm^3$/10 min.

The polymer composition P) preferably contains 8.0 wt. % to 15.0 wt. %, particularly preferably 9.0 wt. % to 12.0 wt. % of glass hollow spheres.

Glass hollow spheres according to the invention are preferably made of low-alkali glasses, preferably borosilicate glass.

Particularly preferred glass hollow spheres are characterized in that the alkalinity of the non-coated glass hollow spheres, measured in accordance with ASTM D3100, is less than 1.0 meq/g, preferably less than 0.8 meq/g and particularly preferably less than 0.6 meq/g. The alkalinity of the glass hollow spheres employed can be reduced further by application of suitable coatings.

Preferably, the glass hollow spheres have a particle density of 0.2 $g/cm^3$-0.8 $g/cm^3$, preferably 0.4 $g/cm^3$-0.7 $g/cm^3$, particularly preferably 0.55 $g/cm^3$-0.65 $g/cm^3$, and an average particle size ($d_{50}$) of 1 μm-70 μm, preferably 5 μm-50 μm, further preferably 5 μm-30 μm and particularly preferably 8

μm-20 μm. The average particle size $d_{50}$ is the diameter (average volume diameter) above and below which in each case 50 wt. % of the particles lie.

In particular, those glass hollow spheres which have a high isostatic compressive strength are preferred. Glass hollow spheres with an isostatic compressive strength of 500 bar-2,500 bar, preferably of 1,000 bar-2,200 bar and particularly preferably of 1,900 bar-2,100 bar are used in the context of the present invention.

The compressive strength stated is the resistance to an isostatic pressure under which at least 80% of the spheres remain undamaged when they are exposed to the said pressure in a column of liquid.

The glass hollow spheres according to the invention can be surface-treated, e.g. silanized, in order to ensure a better compatibility with the polymer.

Glass hollow spheres are commercially obtainable and are marketed, inter alia, by 3M Deutschland GmbH, for example under the product numbers iM30K or S60HS, and by Potters Industries Inc., Malvern, Pa. (USA) under the name 110P8. Such commercial products can be obtained in a non-coated (untreated) and coated (surface-treated) form. In the context of the present invention, the use of coated products is preferred.

In a preferred embodiment, the coextruded layer contains no further filler or reinforcing substances of glass, such as, for example, glass fibres, at all alongside the glass hollow spheres according to the invention.

The polycarbonate of the base layer can likewise contain filler and reinforcing substances, such as glass-containing fillers (for example glass fibres, glass spheres or glass hollow spheres) or talc, in particular if filler-containing recycled polycarbonate is employed as the material for the base layer. However, the filler content of the base layer should be a maximum of 20% of the filler content of the coextruded layer. The base layer can contain 0.0 to 2.0 wt. %, preferably 0.0 wt. % to 1.5 wt. %, particularly preferably 0.0 wt. % of untreated or surface-treated filler and reinforcing substances. Preferably, however, the base layer is free from filler and reinforcing substances.

The polymer composition or the coextruded layer can contain as further additives:
a) 0.000 wt. % to 0.050 wt. % of a single-proton or multi-proton acid, phosphoric and phosphorous acid, in particular 85% strength aqueous orthophosphoric acid, being particularly preferred. If this additive is present, preferred amounts are 0.001 wt. % to 0.010 wt. %, particularly preferably 0.003 wt. % to 0.006 wt. %, and
b) 0.0 wt. % to 10.0 wt. %, preferably from 0.0 wt. % to 8.0 wt. %, particularly preferably from 0.1 wt. % to 7.0 wt. % of at least one or more UV absorbers, the wt. % data corresponding to the total amount of all the UV absorbers.

The thermoplastic for the base layer is polycarbonate which has an MVR of from 3 to 9 $cm^3$/10 min. The composition contains the transparent thermoplastic in an amount such that with the remaining components, such as additives, this gives 100 wt. %.

The polymer composition of the base layer can contain 0.00 wt. % to 0.50 wt. %, preferably 0.05 wt. % to 0.4 wt. %, particularly preferably 0.1 wt. % to 0.35 wt. % of at least one or more UV absorbers, the wt. % data corresponding to the total amount of all the UV absorbers.

The following additives are suitable as further additives for the polymer composition of the coextruded layer and the base layer:
c) 0.00 wt. % to 0.20 wt. %, preferably 0.01 wt. % to 0.10 wt. % of one or more heat or processing stabilizers, based on the total amount of heat and processing stabilizers, preferably chosen from the group of phosphines, phosphites and phenolic antioxidants and mixtures thereof, the wt. % data corresponding to the total amount of all the heat and processing stabilizers,
d) 0.00000 wt. % to 5.00000 wt. %, preferably 0.00001 wt. % to 1.00000 wt. % of one or more further additives, based on the total amount of additives.

The polymer composition can furthermore also contain a mould release agent. This is conventionally employed in an amount of from 0.00 wt. % to 1.00 wt. %, preferably 0.01 wt. % to 0.50 wt. %, particularly preferably 0.01 wt. % to 0.40 wt. %. Preferably, the polymer composition of the coextruded layer or coextruded layer and base layer contains no mould release agent.

The amounts stated for the individual additives are in each case based on the total polymer composition both of the coextruded layer and of the base layer. The additives can in each case be employed by themselves or in a combination of two or more.

Polycarbonates in the context of the present invention are both homopolycarbonates, copolycarbonates and polyester carbonates. Particularly preferred polycarbonates in the context of the present invention are homopolycarbonates based on bisphenol A and copolycarbonates based on the two monomers bisphenol A and 1,1-bis-(4-hydroxyphenyl)-3,3,5-trimethylcyclohexane, preferably in a weight ratio of from 9:1 to 3:7. The polycarbonates can be linear or branched in a known manner.

The preparation of the polycarbonates is carried out in a known manner from diphenols, carbonic acid derivatives, optionally chain terminators and branching agents. Details of the preparation of polycarbonates have been laid down in many patent specifications for about 40 years. Reference may be made here by way of example merely to Schnell, "Chemistry and Physics of Polycarbonates", Polymer Reviews, volume 9, Interscience Publishers, New York, London, Sydney 1964, to D. Freitag, U. Grigo, P. R. Müller, H. Nouvertne, BAYER AG, "Polycarbonates" in Encyclopedia of Polymer Science and Engineering, volume 11, second edition, 1988, pages 648-718 and finally to Dres. U. Grigo, K. Kirchner and P. R. Müller "Polycarbonate" in Becker/Braun, Kunststoff-Handbuch, volume 3/1, Polycarbonate, Polyacetale, Polyester, Celluloseester, Carl Hanser Verlag Munich, Vienna 1992, pages 117-299.

Diphenols which are suitable for the preparation of the polycarbonates are, for example, hydroquinone, resorcinol, dihydroxydiphenyls, bis-(hydroxyphenyl)-alkanes, bis-(hydroxyphenyl)-cycloalkanes, bis-(hydroxyphenyl) sulfides, bis-(hydroxyphenyl) ethers, bis-(hydroxyphenyl) ketones, bis-(hydroxyphenyl) sulfones, bis-(hydroxyphenyl) sulfoxides, alpha-alpha'-bis-(hydroxyphenyl)-diisopropylbenzenes, phthalimidines derived from derivatives of isatin or of phenolphthalein, and nucleus-alkylated and nucleus-halogenated compounds thereof.

Preferred diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl) sulfone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5- dichloro-4-hydroxyphenyl)-propane, 2,2-bis-(3,5-dibromo-4-hydroxyphenyl)-propane and 1,1-bis-(4-hydroxyphenyl)-3,3,5-trimethylcyclohexane.

Particularly preferred diphenols are 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and 1,1-bis-(4-hydroxyphenyl)-3,3,5-trimethylcyclohexane.

These and further suitable diphenols are described e.g. in U.S. Pat. No. 3,028,635, U.S. Pat. No. 2,999,825, U.S. Pat. No. 3,148,172, U.S. Pat. No. 2,991,273, U.S. Pat. No. 3,271,367, U.S. Pat. No. 4,982,014 and U.S. Pat. No. 2,999,846, in DE-A 1 570 703, DE-A 2 063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and in JP-A 62039/1986, JP-A 62040/1986 and JP-A 105550/1986.

In the case of homopolycarbonates, only one diphenol is employed, and in the case of copolycarbonates several diphenols are employed.

Suitable carbonic acid derivatives are, for example, phosgene or diphenyl carbonate.

Suitable chain terminators which can be employed in the preparation of the polycarbonates are both monophenols and monocarboxylic acids. Suitable monophenols are phenol itself, alkylphenols, such as cresols, p-tert-butylphenol, cumylphenol, p-n-octylphenol, p-iso-octylphenol, p-n-nonylphenol and p-iso-nonylphenol, halophenols, such as p-chlorophenol, 2,4-dichlorophenol, p-bromophenol and 2,4,6-tribromophenol, 2,4,6-triiodophenol, p-iodophenol and mixtures thereof.

Preferred chain terminators are phenol, cumylphenol and/or p-tert-butylphenol.

Suitable monocarboxylic acids are furthermore benzoic acid, alkylbenzoic acids and halobenzoic acids.

Preferred chain terminators are furthermore the phenols which are substituted once or several times by C1 to C30-alkyl radicals, linear or branched, preferably unsubstituted or substituted by tert-butyl.

The amount of chain terminator to be employed is preferably 0.1 to 5 mol %, based on the moles of the particular diphenols employed. The chain terminators can be added before, during or after the phosgenation.

Suitable branching agents are the tri- or more than trifunctional compounds known in polycarbonate chemistry, in particular those with three or more than three phenolic OH groups.

Suitable branching agents are, for example, phloroglucinol, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenylisopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenylisopropyl)-phenyl)-orthoterephthalic acid ester, tetra-(4-hydroxyphenyl)-methane, tetra-(4-(4-hydroxyphenylisopropyl)-phenoxy)-methane and 1,4-bis-((4',4"-dihydroxytriphenyl)-methyl)-benzene as well as 2,4-dihydroxybenzoic acid, trimesic acid, cyanuric chloride and 3,3-bis-(3-methyl-4-hydroxyphenyl)-2-oxo-2,3-dihydroindole.

The amount of branching agents optionally to be employed is preferably 0.05 mol % to 2.00 mol %, based on the moles of the particular diphenols employed.

The branching agents either can be initially introduced with the diphenols and the chain terminators in the aqueous alkaline phase, or can be added as a solution in an organic solvent before the phosgenation. In the case of the transesterification process, the branching agents are employed together with the diphenols.

If the polycarbonate is employed as a thermoplastic in the coextruded layer A), it has a weight-average molecular weight Mw of from 24,000 to 33,000, preferably from 25,000 to 32,000, further preferably from 25,000 to 30,000, particularly preferably from 25,000 to 27,000 g/mol, the particular limit values in each case being included. The melt volume rate MVR (measured in accordance with DIN EN ISO 1133 under a 1.2 kg load at 300° C.) is preferably 1.5 $cm^3$/10 min to 22.5 $cm^3$/10 min, particularly preferably 8 $cm^3$/10 min to 16 $cm^3$/10 min.

If the polycarbonate is employed as a thermoplastic in the base layer, it has a weight-average molecular weight Mw of from 26,000 to 35,000, preferably from 28,000 to 33,000, particularly preferably from 29,000 to 32,000, the particular limit values in each case being included. The melt volume rate MVR (measured in accordance with DIN EN ISO 1133 under a 1.2 kg load at 300° C.) is preferably 1.5 $cm^3$/10 min to 16 $cm^3$/10 min, particularly preferably 3 $cm^3$/10 min to 9 $cm^3$/10 min.

The weight-average molecular weights are in each case determined by gel permeation chromatography and calibration with a polycarbonate standard.

In a specific embodiment of the present invention, exclusively in each case a homopolycarbonate based on 2,2-bis-(4-hydroxyphenyl)-propane is employed as the thermoplastic both for the polymer composition of the base layer and for the polymer composition of the coextruded layer. Preferably, these homopolycarbonates are linear, i.e. they contain no branching agents at all.

In the context of the present invention, single-proton or multi-proton acids mean, for example, vinylphosphoric acid, citric acid, phosphorous acid and phosphoric acid. 85% strength aqueous orthophosphoric acid is particularly preferred.

Mould releasers or mould release agents in the context of the present invention are compounds based on % of pentaerythritol tetrastearate (PETS), commercially obtainable, for example, as Loxiol® VPG 861 from Emery Oleochemicals Europe, Düsseldorf, Germany;

based on glycerol monostearate, commercially obtainable, for example, as Loxiol® EP 129 from Emery Oleochemicals Europe, Düsseldorf, Germany or Dimodan HAB from Danisco, Copenhagen, Denmark;

based on 2-octyldodecyl stearate, commercially obtainable, for example, as Loxiol® 3820 from Emery Oleochemicals Europe, Düsseldorf, Germany;

based on a branched ester mixture (CAS 573991-39-6), commercially obtainable as Lubril® JK from Rhodia GmbH, Frankfurt, Germany based on ester waxes, commercially obtainable, for example, as Loxiol® G 32 from Emery Oleochemicals Europe, Düsseldorf, Germany;

The mould release agents mentioned can be employed by themselves or in mixtures. In the context of the present invention, the use of mould release agents based on pentaerythritol tetrastearate and based on 2-octyldodecyl stearate, by themselves or in a mixture, is preferred.

UV absorbers which can be employed in the context of the invention both in the base layer and in the coextruded layer are compounds which have a lowest possible transmission of below 400 nm and a highest possible transmission of above 400 nm. Such compounds and the preparation thereof are known from the literature and are described, for example, in EP-A 0 839 623, WO-A 96/15102 and EP-A 0 500 496. Examples of such UV absorbers are benzotriazoles, triazines, benzophenones and/or arylated cyanoacrylates.

UV absorbers of the benzotriazole type are, for example and preferably, 2-(3',5'-bis-(1,1-dimethylbenzyl)-2'-hydroxyphenyl)-benzotriazole (Tinuvin® 234, BASF SE, Ludwigshafen), 2-(2'-hydroxy-5'-(tert-octyl)-phenyl)-benzotriazole (Tinuvin® 329, BASF SE, Ludwigshafen), 2-(2'-hydroxy-3'-(2-butyl)-5'-(tert-butyl)-phenyl)-benzotriazole (Tinuvin® 350, BASF SE, Ludwigshafen) and bis-(3-(2H-benzotriazolyl)-2-hydroxy-5-(tert-octyl)methane, (Tinuvin® 360, BASF SE, Ludwigshafen).

UV absorbers of the triazine type are, for example and preferably, (2-(4,6-diphenyl-1,3,5-triazin-2-yl)-5-(hexyloxy)-phenol (Tinuvin® 1577, BASF SE, Ludwigshafen) and 2-[2-hydroxy-4-(2-ethylhexyl)oxy]phenyl-4,6-di-(4-phenyl)phenyl-1,3,5-triazine (CGX UVA 006 or also Tinuvin® 1600, BASF SE, Ludwigshafen).

UV absorbers of the benzophenone type are, for example and preferably, 2,4-dihydroxybenzophenone (Chimasorb® 22, BASF SE, Ludwigshafen) and 2-hydroxy-4-(octyloxy)-benzophenone (Chimasorb® 81, BASF SE, Ludwigshafen).

UV absorbers from the classes of cyanoacrylates and of malonates can furthermore be employed, such as, for example and preferably, 1,3-bis-[(2'-cyano-3',3'-diphenylacryloyl)oxy]-2,2-bis-{[(2'-cyano-3',3'-diphenylacryloyl)oxy]methyl}-propane (Uvinul® 3030, BASF SE Ludwigshafen) or tetraethyl 2,2'-(1,4-phenylenedimethylidene)-bismalonate (Hostavin® B-Cap, Clariant AG).

In a specific embodiment of the present invention, the polymer composition of the coextruded layer contains one or more UV absorbers, no UV absorber from the benzotriazole group being present.

Preferred UV absorbers for the coextruded layer are 2-[2-hydroxy-4-(2-ethylhexyl)oxy]phenyl-4,6-di(4-phenyl)phenyl-1,3,5-triazine (CGX UVA 006 or also Tinuvin®600, BASF SE, Ludwigshafen) or (2-(4,6-diphenyl-1,3,5-triazin-2-yl)-5-(hexyloxy)-phenol (Tinuvin® 1577, BASF SE, Ludwigshafen).

In a further specific embodiment of the present invention, the coextruded layer is free from any UV absorbers.

In the context of the present invention, phosphites and phosphonites as well as phosphines are particularly suitable as heat or processing stabilizers.

Examples are triphenyl phosphite, diphenyl alkyl phosphite, phenyl dialkyl phosphite, tris(nonylphenyl)phosphite, trilauryl phosphite, trioctadecyl phosphite, distearylpentaerythritol diphosphite, tris(2,4-di-tert-butylphenyl)phosphite, diisodecylpentaerythritol diphosphite, bis(2,4-di-tert-butylphenyl)pentaerythritol diphosphite, bis(2,4-dicumylphenyl)pentaerythritol diphosphite, bis(2,6-di-tert-butyl-4-ethylphenyl)pentaerythritol diphosphite, diisodecyloxypentaerythritol diphosphite, bis(2,4-di-tert-butyl-6-methylphenyl)-pentaerythritol diphosphite, bis(2,4,6-tris(tert-butylphenyl)pentaerythritol diphosphite, tristearylsorbitol triphosphite, tetrakis(2,4-di-tert-butylphenyl)-4,4'-biphenylene diphosphonite, 6-isooctyloxy-2,4,8,10-tetra-tert-butyl-12H-dibenz[d,g]-1,3,2-dioxaphosphocine, bis(2,4-di-tert-butyl-6-methylphenyl)methyl phosphite, bis(2,4-di-tert-butyl-6-methylphenyl)ethyl phosphite, 6-fluoro-2,4,8,10-tetra-tert-butyl-12-methyl-dibenz[d,g]-1,3,2-dioxaphosphocine, 2,2',2"-nitrilo-[triethyl-tris(3,3',5,5'-tetra-tert-butyl-1,1'-biphenyl-2,2'-diyl)phosphite], 2-ethylhexyl(3,3',5,5'-tetra-tert-butyl-1,1-biphenyl-2,2'-diyl)phosphite, 5-butyl-5-ethyl-2-(2,4,6-tri-tert-butylphenoxy)-1,3,2-dioxaphosphirane, bis(2,6-di-tert-butyl-4-ethylphenyl)pentaerythritol diphosphite, triphenylphosphine (TPP), trialkylphenylphosphine, bisdiphenylphosphinoethane or a trinaphthylphosphine.

Particularly preferably, triphenylphosphine (TPP), Irgafos® 168 (tris(2,4-di-tert-butyl-phenyl)phosphite) and tris(nonylphenyl)phosphite or mixtures thereof are employed.

Phenolic antioxidants, such as alkylated monophenols, alkylated thioalkylphenols, hydroquinones and alkylated hydroquinones, can furthermore be employed. Particularly preferably, Irganox® 1010 (pentaerythritol 3-(4-hydroxy-3,5-di-tert-butylphenyl)propionate; CAS: 6683-19-8) and Irganox 1076® (2,6-di-tert-butyl-4-(octadecanoxycarbonylethyl)phenol) are employed.

Further additives in the context of the present invention are, for example, antistatics, inorganic pigments, organic dyestuffs, flameproofing agents, IR absorbers or optical brighteners. In this context, the inorganic pigments and/or organic dyestuffs can be added both during the compounding and, preferably, during the extrusion of the sheet. In the case of extrusion, the addition preferably takes place via a colour masterbatch which contains a high concentration of the additives mentioned in a polycarbonate carrier matrix. The inorganic pigments and/or organic dyestuffs can be used both in the base layer and in the coextruded layer.

It has been found that to achieve the object according to the invention it is important to maintain particular layer thicknesses in the coextruded sheets according to the invention. In particular, the thickness of the coextruded sheet containing glass hollow spheres must remain in a narrowly defined range, so that in addition to a high scratch resistance, pleasant haptic properties, above all an excellent homogeneous external visual impression, can be achieved.

In the context of the present invention, layer thicknesses of the coextruded layer are from 50 µm to 300 µm, preferably 90 µm to 250 µm, further preferably 100 µm to 200 µm, particularly preferably 120 µm to 170 µm The thickness of the coextruded layer is defined here as the mean of two measurements, one in the middle of the sheet and one at a distance of 10 cm from the edge, based on the sheet width. The layer thickness of the coextruded layer was determined with the aid of light microscopy. In the context of the present invention the thickness of the total sheet including the base layer and coextruded layer is 1 mm to 8 mm, preferably 1 mm to 5 mm, particularly preferably 2 mm to 4 mm.

The preparation of the moulding compositions for the coextruded layer is carried out by compounding processes known per se, preferably using twin-screw extruders. However, it has proved to be advantageous here to set particular process parameters. These include metering of the glass hollow spheres via a lateral intake directly into the melt with an optimized configuration of the melt temperature and extruder speed. The melt temperature is 320° C. to 380° C., preferably from 330° C. to 360° C., particularly preferably 330° C. to 355° C. The extruder speed is 300 rpm to 500 rpm, preferably 360 rpm to 500 rpm.

The coextruded sheets are produced by conventional coextrusion processes, for example using coextrusion adapters or coextrusion dies. The coextrusion die is preferred.

EXAMPLES

For production of coextruded sheets, in the context of the present invention various polymer compositions for the coextruded layer were prepared by compounding.

The equipment for the compounding comprises:
four gravimetric metering balances from K-Tron
an Evolum 32HT co-rotating twin-screw extruder from Clextral with a screw diameter of 32 mm
a perforated die for shaping melt strands
a water bath for cooling and solidifying the strands
a granulator
optional ancillary extruder on barrel 5 (lateral intake)
extruder with 11 barrels at 4D length
vacuum devolatilization by means of a water-ring pump on barrel 10.

The throughput was 50 kg/h.

The polymer compositions prepared for the coextruded layer and the compounding conditions selected are described below in more detail.

In this process, the 85% strength orthophosphoric acid used (analytical quality EMSURE® ACS, ISO, reag. Ph Eur) was in all cases added via the intake (at barrel 1) as a mixture with polycarbonate powder.

The polycarbonate granules were likewise metered in via the intake at barrel 1.

The glass hollow spheres were metered in either via the lateral intake at barrel 5 or via the intake at barrel 1. If metered in via the lateral intake (also called ancillary extruder), the addition was "unpressurized".

Glass hollow spheres which were employed in the examples are characterized as follows: 3M Experimental Glass Bubbles, amorphous silica treated based on iM30K from 3M Deutschland GmbH, Neuss, Germany, with an alkalinity of ≤0.5 meq/g and an average particle size $d_{50}$ of 17 μm (volume diameter). The isostatic compressive strength is 2,000 bar.

UV absorber CGX UVA 006 from BASF SE, Ludwigshafen, is -[2-hydroxy-4-(2-ethylhexyl)oxy]phenyl-4,6-di(4-phenyl)phenyl-1,3,5-triazine.

TPP is triphenylphosphine.

Uvitex OB is 2,5-thiophenediyl-bis(5-tert-butyl-1,3-benzoxazole), an optical brightener from BASF SE, Ludwigshafen.

Polymer Composition of Coextruded Layer A:
85.000% of Makrolon® 3100 000000, a heat-stabilized linear polycarbonate from Bayer MaterialScience AG, Leverkusen, based on bisphenol A with a melt volume rate MVR of 6 cm³/10 min (measured in accordance with DIN EN ISO 1133 under a 1.2 kg load at 300° C.), 10.000% of glass hollow spheres and a premix of 4.940% of Makrolon® 3108 powder, a linear polycarbonate from Bayer MaterialScience AG, Leverkusen, based on bisphenol A with a melt volume rate MVR of 6 cm³/10 min (measured in accordance with DIN EN ISO 1133 under a 1.2 kg load at 300° C.), 0.030% of CGX UVA 006, 0.025% of TPP and 0.0050% of phosphoric acid are compounded.

Compounding conditions A:
Speed: 450 rpm, melt temperature 370° C.
The barrel temperatures were 80° C. in zone 1, 220-223° C. in zone 2 and between 310 and 349° C. in each of the following zones.
The glass hollow spheres were added via the lateral intake at barrel 5.

Polymer Composition of Coextruded Layer B:
85.000% of Makrolon® 2600 000000, a heat-stabilized linear polycarbonate from Bayer MaterialScience AG, Leverkusen, based on bisphenol A with a melt volume rate MVR of 12.5 cm³/10 min (measured in accordance with DIN EN ISO 1133 under a 1.2 kg load at 300° C.), 10.0000% of glass hollow spheres and a premix of 4.940% of Makrolon® 3108 powder, a linear polycarbonate from Bayer MaterialScience AG, Leverkusen, based on bisphenol A with a melt volume rate MVR of 6 cm³/10 min (measured in accordance with DIN EN ISO 1133 under a 1.2 kg load at 300° C.), 0.030% of CGX UVA 006, 0.025% of TPP and 0.0050% of phosphoric acid are compounded.

Compounding conditions B:
Speed: 450 rpm, melt temperature 345° C.
The barrel temperatures were 78-80° C. in zone 1, 200-205° C. in zone 2 and between 270 and 327° C. in each of the following zones.
The glass hollow spheres were introduced via the lateral intake at barrel 5.

Polymer Composition of Coextruded Layer C:
85.000% of Makrolon® 2600 000000, a heat-stabilized linear polycarbonate from Bayer MaterialScience AG, Leverkusen, based on bisphenol A with a melt volume rate MVR of 12.5 cm³/10 min (measured in accordance with DIN EN ISO 1133 under a 1.2 kg load at 300° C.), 10.0000% of glass hollow spheres and a premix of 4.970% of Makrolon® 3108 powder, a linear polycarbonate from Bayer MaterialScience AG, Leverkusen, based on bisphenol A with a melt volume rate MVR of 6 cm³/10 min (measured in accordance with DIN EN ISO 1133 under a 1.2 kg load at 300° C.), 0.025% of TPP and 0.0050% of phosphoric acid are compounded.

Compounding conditions C:
Speed: 450 rpm, melt temperature 339° C.
The barrel temperatures were 79-80° C. in zone 1, 200-218° C. in zone 2 and between 270 and 318° C. in each of the following zones.
The glass hollow spheres were added via the lateral intake at barrel 5.

Polymer Composition of Coextruded Layer D:
85.000% of Makrolon® 2600 000000, a heat-stabilized linear polycarbonate from Bayer MaterialScience AG, Leverkusen, based on bisphenol A with a melt volume rate MVR of 12.5 cm³/10 min (measured in accordance with DIN EN ISO 1133 under a 1.2 kg load at 300° C.), 10.0000% of glass hollow spheres and a premix of 4.970% of Makrolon® 3108 powder, a linear polycarbonate from Bayer MaterialScience AG, Leverkusen, based on bisphenol A with a melt volume rate MVR of 6 cm³/10 min (measured in accordance with DIN EN ISO 1133 under a 1.2 kg load at 300° C.), 0.025% of TPP and 0.0050% of phosphoric acid are compounded.

Compounding conditions D:
Extruder speed: 325 rpm, melt temperature 342° C.
The barrel temperatures were 78-80° C. in zone 1, 200-216° C. in zone 2 and between 308 and 326° C. in each of the following zones.
The glass hollow spheres were added via the intake at barrel 1.

Polymer Composition of Coextruded Layer E:
85.000% of Makrolon® 3100 000000, a heat-stabilized linear polycarbonate from Bayer MaterialScience AG, Leverkusen, based on bisphenol A with a melt volume rate MVR of 6 cm³/10 min (measured in accordance with DIN EN ISO 1133 under a 1.2 kg load at 300° C.), 10.000% of glass hollow spheres and a premix of 4.950% of Makrolon® 3108 powder, a linear polycarbonate from Bayer MaterialScience AG, Leverkusen, based on bisphenol A with a melt volume rate MVR of 6 cm³/10 min (measured in accordance with DIN EN ISO 1133 under a 1.2 kg load at 300° C.), 0.025% of TPP, 0.02 wt. % of Uvitex® OB and 0.0050% of phosphoric acid are compounded.

Compounding conditions E:

Speed: 225 rpm, melt temperature 335° C.

The barrel temperatures were 80° C. in zone 1, 198° C. in zone 2 and between 298 and 321° C. in each of the following zones.

The glass hollow spheres were added via the lateral intake at barrel 5.

Polymer Composition of Coextruded Layer F:

85.000% of Makrolon® 3100 000000, a heat-stabilized linear polycarbonate from Bayer MaterialScience AG, Leverkusen, based on bisphenol A with a melt volume rate MVR of 6 cm$^3$/10 min (measured in accordance with DIN EN ISO 1133 under a 1.2 kg load at 300° C.), 10.000% of glass hollow spheres and a premix of 4.750% of Makrolon® 3108 powder, a linear polycarbonate from Bayer MaterialScience AG, Leverkusen, based on bisphenol A with a melt volume rate MVR of 6 cm$^3$/10 min (measured in accordance with DIN EN ISO 1133 under a 1.2 kg load at 300° C.), 0.200 wt. % of Tinuvin® Tinuvin 360, 0.025% of TPP, 0.020 wt. % of Uvitex® OB and 0.0050% of phosphoric acid are compounded.

Compounding conditions F:

Speed: 226 rpm, melt temperature 336° C.

The barrel temperatures were 80° C. in zone 1, 201° C. in zone 2 and between 298 and 318° C. in each of the following zones.

The glass hollow spheres were added via the lateral intake at barrel 5.

The polymer compositions of coextruded layer E and F were produced with an extruder configuration comparable to the compounding of Examples A-D.

The coex sheets produced using E and F contained agglomerates of glass hollow spheres. Comparison of the MVR values of E and F shows that 0.2% of Tinuvin® 360 has an adverse effect on the molecular weight (increase in the MVR).

Coextruded polycarbonate sheets were produced in the following using the polymer compositions described above for the coextruded layer. The process variants described in the following were used in this process.

Coextrusion Process (Die Process):

Polycarbonate solid sheets were produced with the aid of the following machines and apparatuses:

a single-screw extruder (devolatilization extruder, screw diameter 60 mm and a single screw of length 33 D, single screw, Breyer, Singen/Germany)
  The extruder is equipped with a vacuum melt devolatilization.
an MAAG melt pump
a 1-layer solid sheet coextrusion die (from Breyer, Singen/Germany) with a width of 400 mm for solid sheets of from 1 to 10 mm
a 3-zone coextruder with a diameter of 30 mm and a length of 25 D
a horizontal triple-roll calender, width 500 mm, diameter 300 mm, Breyer, Singen/Germany
a roller conveyor, roller conveyer length (calender/cutting station distance) 6 m
take-off rolls,
a transverse cutting device (circular saw)
a stacking table.

The solid sheets provided with a coextruded layer on one side (sheets 1-7, see Table 1) were produced as follows:

The polycarbonate granules for the base (PC-1 in the following), linear polycarbonate based on bisphenol A with a melt volume rate MVR of 6.0 cm$^3$/10 min (under a 1.2 kg load at 300° C., measured in accordance with DIN EN ISO 1133), containing 0.1 wt. % of Tinuvin® 360 as a UV absorber and 0.05 wt. % of triphenylphosphine, were fed in the non-dried state in each case to the hopper of the main extruder and melted and conveyed via the barrels/screw. The temperatures of the individual barrels of the main extruder were 280° to 290° C., and the resulting melt temperature was 300° C. The melt pumping speed was set at 42 rpm and the resulting screw speed was between 54 and 56 rpm. In each case the polymer compositions for coextruded layer A-F was used as the material for the one-sided coextruded layer, and these were in each case fed in the predried state (4 h at 120° C. in a dry air drier) to the hopper of the coextruder. The barrel temperatures of the coextruder were 180 to 240° C. and the melt temperature was approx. 240° C. The screw speed was 45 rpm.

The two material melts were brought together in the coextrusion die and then conveyed into a sheet die which was set with a lip gap of 2.8 mm. The take-off speed was 1.22 m/min. The roll temperatures of the calender were 115°, 125° and 135° C. for rolls 1, 2 and 3, and the roll nip was set such that a 2.0 mm thick sheet results.

Further devices of the plant served for transportation, cutting into lengths and stacking of the sheets.

The sheets produced in this way had a total thickness of 2.0 mm and a sheet width of 400 mm. The top layer (from the coextrusion) contains compositions A-F in an average thickness of 100 μm or 150 μm (see Table 1).

Determination of the Layer Thickness of the Coextruded Layer:

The layer thickness of the coextruded layer is measured by means of light microscopy with an Axioplan microscope from Zeiss with a scaled eyepiece and objectives with in each case 50-fold and 200-fold magnification using an HBO 50 W mercury vapour lamp from Philips.

For the measurement, a specimen piece with a length of 1 cm and a width of 0.5 cm is first sawn out of the sheet under investigation at the selected sites. A thin section of this specimen piece with a thickness of 20 μm is then produced along the sheet cross-section with an HM 355 S microtome from Thermo Fisher Scientific. The layer thickness of the coextruded layer is then determined visually by light microscopy, using the apparatus described above, as the difference between the positions of the base layer/coextruded layer interface and the coextruded layer/air interface in μm.

TABLE 1

Composition and properties of the coextruded sheets produced:

| Structure of the coextruded sheet | Sheet 1 comp. | Sheet 2 acc. to inv. | Sheet 3 acc. to inv. | Sheet 4 acc. to inv. | Sheet 5 acc. to inv. | Sheet 6 comp. | Sheet 7 comp. |
|---|---|---|---|---|---|---|---|
| Polymer composition of the coextruded layer | A | B | C | C | D | E | F |
| MVR of the polycarbonate granules chiefly employed in the compounding of the polymer composition for the coextruded layer | 6 | 12.5 | 12.5 | 12.5 | 12.5 | 6 | 6 |

TABLE 1-continued

Composition and properties of the coextruded sheets produced:

| Structure of the coextruded sheet | Sheet 1 comp. | Sheet 2 acc. to inv. | Sheet 3 acc. to inv. | Sheet 4 acc. to inv. | Sheet 5 acc. to inv. | Sheet 6 comp. | Sheet 7 comp. |
|---|---|---|---|---|---|---|---|
| MVR of the polymer composition of the coextruded layer after compounding (before coextrusion) | 10.0 | 15.5 | 15.7 | 15.7 | 29.0 | 5.4 | 8.9 |
| UV absorber of the polymer composition of the coextruded layer | CGX UVA 006 | CGX UVA 006 | No UV absorber | No UV absorber | No UV absorber | No UV absorber | Tinuvin ® 360 |
| Metering point of glass hollow spheres in the compounding of the polymer composition for the coextruded layer | Lateral intake | Lateral intake | Lateral intake | Lateral intake | Intake | Lateral intake | Lateral intake |
| Extruder speed in the compounding of the polymer composition for the coextruded layer | 450 rpm | 450 rpm | 450 rpm | 450 rpm | 325 rpm | 225 rpm | 226 rpm |
| Melt temperature (° C.) | 370 | 345 | 339 | 339 | 342 | 335 | 336 |
| Base layer | PC-1 | PC-1 | PC-1 | PC-1 | PC-1 | PC-1 | PC-1 |
| Coextrusion process variant | Die process | Die process | Die process | Die process | Die process | Die process | Die process |
| Total thickness of the sheet | | | | | | | |
| Average layer thickness of the coextruded layer | 150 μm | 150 μm | 150 μm | 100 μm | 100 μm | 100 μm | 100 μm |
| Visual impression (homogeneity of the surface) | o | + | ++ | ++ | − (fibrous surface) | − (visible agglomerates of glass spheres) | − (visible agglomerates of glass spheres) |

Legend:
o = average;
+ = good;
++ = very good;
− = poor

It can be seen from the table that polymer compositions B), C) and D) according to the invention show a good homogeneity of the surface, while the comparison polymer compositions A), E) and F) show only an average to poor homogeneity with sometime clearly visible agglomerates of glass hollow spheres.

Table 1 furthermore shows that sheets which have the polymer composition according to the invention as layer A) have a good homogeneity of the surface (sheet 2, 3, 4 and 5).

It can be clearly seen from Table 1 that if a lateral intake of the extruder, instead of the normal intake, and an increased speed is used and at defined material temperatures (the expression melt temperature is also used as a synonym) during the compounding of the polymer composition according to the invention used for layer A) the homogeneity of the sheet surface is improved significantly compared with compounding via the normal intake (sheet 4 and 5) or with a lateral intake but at lower speeds (sheets 6 and 7) or with a lateral intake and increased speed but at higher material temperatures (sheet 1). Adherence to particular process parameters likewise contributes, during the compounding of the polymer composition, to an improved homogeneity.

Determination of the Scratch Resistance by Means of a Pencil Hardness Tester in Accordance with ISO 15184 or ASTM D3363:

Test specimens were prepared from the particular sheets or thermoformed workpieces by sawing and were fixed on to a glass plate. The pencil hardness was determined using the Wolf-Wilburn pencil hardness tester of BYK-Gardner and pencils from Cretacolor. In this, in accordance with ISO 15184, the designation of the pencil which just no longer causes damage to the surface in the test arrangement under a pressure of 750 g at an angle of 45° is stated.

The value for sheets 3 and 4 was 2B, in each case measured in the middle of the sheet.

The coextruded sheets according to the invention produced as described above are suitable for the production of semi-finished products by means of thermoforming.

For the thermoforming, which is carried out according to the conventional prior art, sheet 3 of size 1.9×400×500 mm, which was sawed to size from the extruded sheets, was thermoformed on an Illig thermoforming unit (U60 SB53C)

The sheet was first dried at 125° C. for 4 hours.

The warm, predried sheet was laid in the clamping frame of the thermoforming unit with the coex side facing up, clamped, brought to the intended forming temperature of 210° C. by means of an IR lamp (set to 500° C.) from the upper side and then thermoformed. The preheating time in this context was 92 sec.

The forming mould used is a rectangular stepped pyramid with 6 regular steps and a total height of 15 cm, which is temperature-controlled at 80° C. for the process. The mould dimensions are 16×23 cm.

The thermoforming process with sheet 3 proceeded without problems. A uniform surface of good quality is also still present after the thermoforming.

Scratch Test on the Thermoformed Product

The scratch resistance was tested on the thermoformed product on various steps of the stepped pyramid.

Base sheet: at least 2B
At the 1st step: at least 2B
Sheet side 2nd step: at least 2B
At the 3rd step: at least 2B
Sheet side 4th step: at least 2B
At the 5th step: at least 2B

The invention claimed is:

1. A polymer composition P) comprising a polycarbonate with a weight-average molecular weight Mw of from 24,000 to 33,000 and a melt volume rate of from 8 to 16 cm$^3$/10 min, optionally a further polycarbonate with a weight-average molecular weight Mw of from 24,000 to 33,000, and 5.0 wt. % to 20.0 wt. % (based on the total amount of the composition) of glass hollow spheres with an alkalinity of less than 1.0 meq/g and additives, the polymer composition containing no further thermoplastic polymers.

2. The polymer composition according to claim 1, wherein the additives are selected from at least one of the group of single-proton or multi-proton acids, heat or processing stabilizers, UV absorbers, phenolic antioxidants, mould release agents, antistatics, inorganic pigments, organic dyestuffs, flameproofing agents, IR absorbers and optical brighteners.

3. The polymer composition according to claim 1, wherein the polymer contains the glass hollow spheres in an amount of from 8.0 wt. % to 15.0 wt. %.

4. The polymer composition according to claim 1, wherein the glass hollow spheres have a compressive strength of from 500 bar to 2,500 bar.

5. The polymer composition according to claim 1, wherein the composition contains 0.000 wt. % to 0.050 wt. % of a single-proton or multi-proton acid.

6. A process for the production of extruded sheets which comprises utilizing the polymer composition according to claim 1 to produce the extruded sheets.

7. A sheet comprising two layers A) and B), wherein layer A) contains a polymer composition according to claim 1 and layer B) contains polycarbonate with a melt volume rate (MVR) of from 3 to 9 cm$^3$/10 min, wherein the polycarbonate in layer A) has a melt volume rate (MVR) of from 8 to 16 cm$^3$/10 min.

8. The sheet according to claim 7, wherein the thermoplastic in layer B) is a polycarbonate or copolycarbonate with an average molecular weight (weight-average) of from 26,000 to 33,000 g/mol.

9. The sheet according to claim 7, wherein the layer thickness of layer A) is 50 µm to 300 µm and the layer thickness of the sheet comprising layer A) and B) is 1 mm to 8 mm and the sheet is produced by means of coextrusion.

10. A shaped article comprising the sheet according to claim 7.

11. The shaped article according to claim 10, wherein the article is a container or a piece of luggage.

12. A process for the preparation of the polymer composition P) according to claim 1, which comprises mixing the polycarbonate with the glass hollow spheres on a twin-screw extruder, wherein the glass hollow spheres are introduced directly into the melt, which has a melt temperature of from 320° C. to 380° C. via a lateral intake, and the extruder speed is 300 rpm to 500 rpm and the polycarbonate has a melt volume rate (MVR) of from 8 to 16 cm$^3$/10 min.

13. The process according to claim 12, wherein the extruder speed is 360 to 500 rpm and the melt temperature of from 330° C. to 355° C.

* * * * *